United States Patent [19]

Mizuki et al.

[11] 4,171,890
[45] Oct. 23, 1979

[54] DICHROIC RANGEFINDER

[75] Inventors: Yoshiaki Mizuki, Iruma; Michiharu Suwa, Fuchu, both of Japan

[73] Assignee: Nihon Beru-Haueru Kabushiki Kaisha (Bell & Howell Japan, Ltd.), Higashimurayama, Japan

[21] Appl. No.: 864,898

[22] Filed: Dec. 27, 1977

[30] Foreign Application Priority Data

Dec. 27, 1976 [JP] Japan .................................. 51/156419

[51] Int. Cl.² ...................... G03B 13/08; G03B 13/16; G03B 13/20
[52] U.S. Cl. .................................... 354/166; 354/199; 354/225
[58] Field of Search ............... 354/102, 117, 152, 155, 354/162, 163, 164, 166, 199, 201, 225; 356/8, 10, 19; 350/196

[56] References Cited

U.S. PATENT DOCUMENTS

| | | | |
|---|---|---|---|
| 1,957,128 | 5/1934 | Ball et al. | 354/225 |
| 2,373,249 | 4/1945 | Lurcott | 356/10 |
| 2,384,552 | 9/1945 | Kaprelian | 356/8 |
| 2,973,683 | 3/1961 | Rowe et al. | 354/102 X |
| 3,618,498 | 11/1971 | Eppinger | 354/166 X |
| 3,696,724 | 10/1972 | Hartmann | 354/166 X |
| 4,005,447 | 1/1977 | Filipovich | 354/166 |
| 4,072,969 | 2/1978 | Cheavin | 354/225 X |

Primary Examiner—L. T. Hix
Assistant Examiner—Thomas H. Tarcza
Attorney, Agent, or Firm—Aaron Passman; Harold V. Stotland; Roger M. Fitz-Gerald

[57] ABSTRACT

Disclosed is a reflex rangefinder system for a camera having a pair of light reflecting members mounted to reflect light rays from the scene in the viewfinder system. The members are dichroically coated with different complementary colors such that the dual image formed when the objective lens is out of focus have different colors to enhance the distinction for easy focusing.

2 Claims, 5 Drawing Figures

DICHROIC RANGEFINDER

BACKGROUND OF THE INVENTION

This invention relates to an improved rangefinder system for a single reflex type photographic or cinematographic camera. More particularly, the invention relates to a dichroic rangefinder wherein the viewed image of an object is caused to be chromatically fringed when an objective lens is not focused on object, and wherein the chromatically distinct images are made coincident and therefore become neutral when the objective lens is focused. A reflex type rangefinder system which provides chromatically distinguishable images in viewfinder when the objective lens is not focused on the object is known as described in U.S. Pat. No. 3,618,498. The rangefinder system described in U.S. Pat. No. 3,618,498 provides a plano parallel prism as a beamsplitter, with one surface having a dichroic coating and another surface having a totally reflecting coating so to form the natural colored image in viewfinder when objective lens is in focus on the object and to form chromatically colored images in viewfinder when objective lens is out of focus.

The rangefinder system for a single reflex type viewfinder is also known as described in U.S. Pat. No. 3,696,724 wherein a pair of mirrors is provided in the lens system for directing light to the viewfinder. The two-mirror rangefinder system as explained in U.S. Pat. No. 3,696,724 can be used with non-afocal, non-collimated light rays by adjusting the positions of said mirrors relative to each other such that the images can coincide in viewfinder when the lens is in focus. Moreover, such two-mirror rangefinder systems can be made to have accuracy greater than found in rangefinders with prisms for beamsplitting. In the prior art two-mirror system the viewfinder images are not formed chromatically when the lens is out of focus; therefore, the chromatic effect of the U.S. Pat. No. 3,618,498 for dichroic beamsplitters cannot be expected when focusing.

The present invention offers an improved rangefinder system wherein the chromatically distinguishable viewfinder images are formed within the more accurate two-mirror rangefinder; thus, the optical elements are used more effectively.

Therefore, it is an object of this invention to provide a new and improved rangefinder system.

It is also an object of this invention to provide a dichroic dual beam rangefinder suitable for use in a single lens reflex camera.

It is another object of this invention to provide a dual beam rangefinder system including a pair of dichroic mirrors located to intersect light rays peripheral to the film image to permit chromatic light to reach the rangefinder and the maximum amount of light to reach the film.

It is a further object of this invention to provide adjustable mirrors to compensate for converging or diverging light coming from the zoom lens.

SUMMARY OF THE INVENTION

In accordance with this invention, a dichroic dual beam rangefinder system is provided. The rangefinder includes two dichroic reflecting means mounted between the zoom or afocal lens and the prime lens of the shooting lens in a reflex camera so as to reflect light rays from the scene to be photographed into the viewfinder of the camera. The dichroic reflecting means are offset from the optical axis of the camera so that they do not intersect light rays of the film image. The reflected images are received by an optical system forming a part of the viewfinder system. When the images are not superimposed and are of distinct colors, the lens system is out of focus and must be changed. When the images from the reflecting means are superimposed on a predetermined plane in the viewfinder system as seen by the user of the camera, the lens system of the camera is in focus. The reflecting means is two mirrors that are mounted so that they intersect peripheral light not essential to the film image, but which contain all the scene information. Hence, the mirrors do not reduce the amount of light passing to the film as much as in prior art systems. In addition, each mirror is coated with material which reflects a certain color e.g. red light or blue-green. Blue-green light is complementary to red light so that the reflecting surfaces form a neutral colored image in the viewfinder when the objective lens is in focus. Separate red and blue-green images are formed in viewfinder when the objective lens is out of focus.

The present rangefinder is particularly effective for focusing because of the combination of the double image and two color images. The invention is inexpensive to manufacture only having two dichroic mirrors which are positioned so as to not intersect the film image forming bundle of light rays. The light passed to the film is greater than with prior art systems that use dichroic beamsplitters. In addition, because the mirrors utilize peripheral light, which is unused for film image formation, a greater amount of light is available for the eye of the camera user. Hence, a camera or optical instrument incorporating the invention is superior in low light environments than prior art rangefinder cameras with beamsplitters. The present dual beam rangefinder system provides a cost advantage over the prior art by having each mirror adjustable to compensate for divergent or convergent light rays coming from the zoom lens. The cost advantage is derived from being able to produce a zoom lens unit with wider tolerance range for locating a series of lens elements than would normally be acceptable. A wider tolerance range provides a substantial manufacturing cost reduction and allows design freedom in that the system need not be strictly afocal.

DETAILED DESCRIPTION OF THE DRAWINGS

Figure 1:
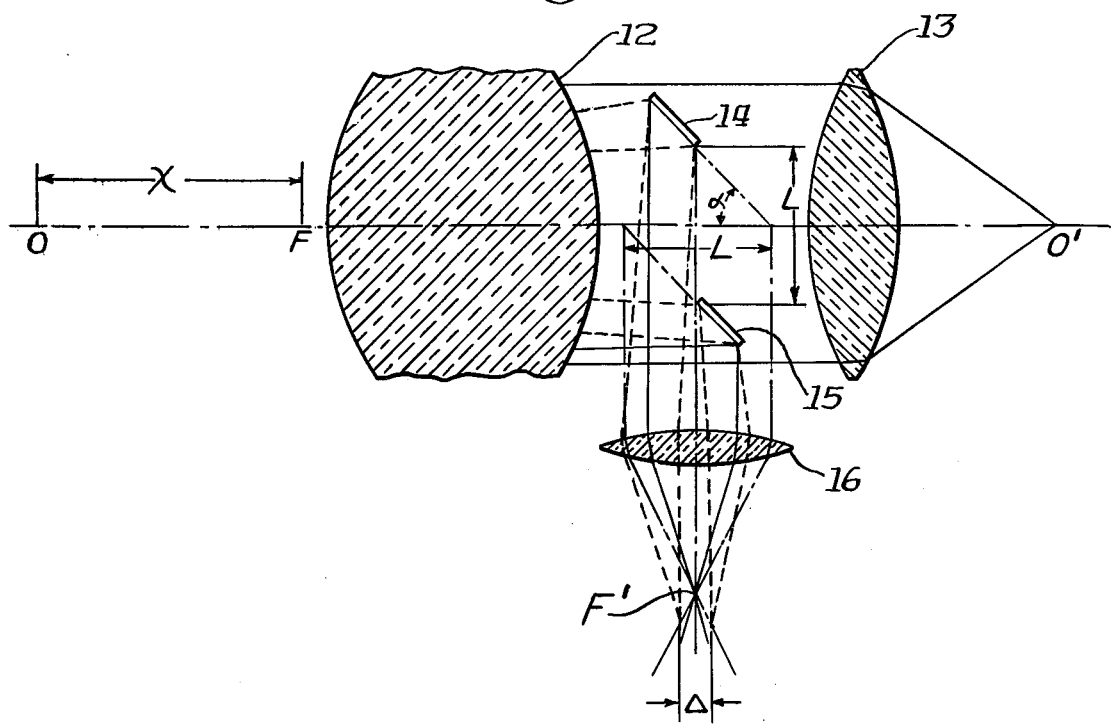
FIG. 1 is a schematic showing of the invention wherein the reflex dual mirror rangefinder is disposed between the zoom lens and the main lens of the camera.
Figure 2:
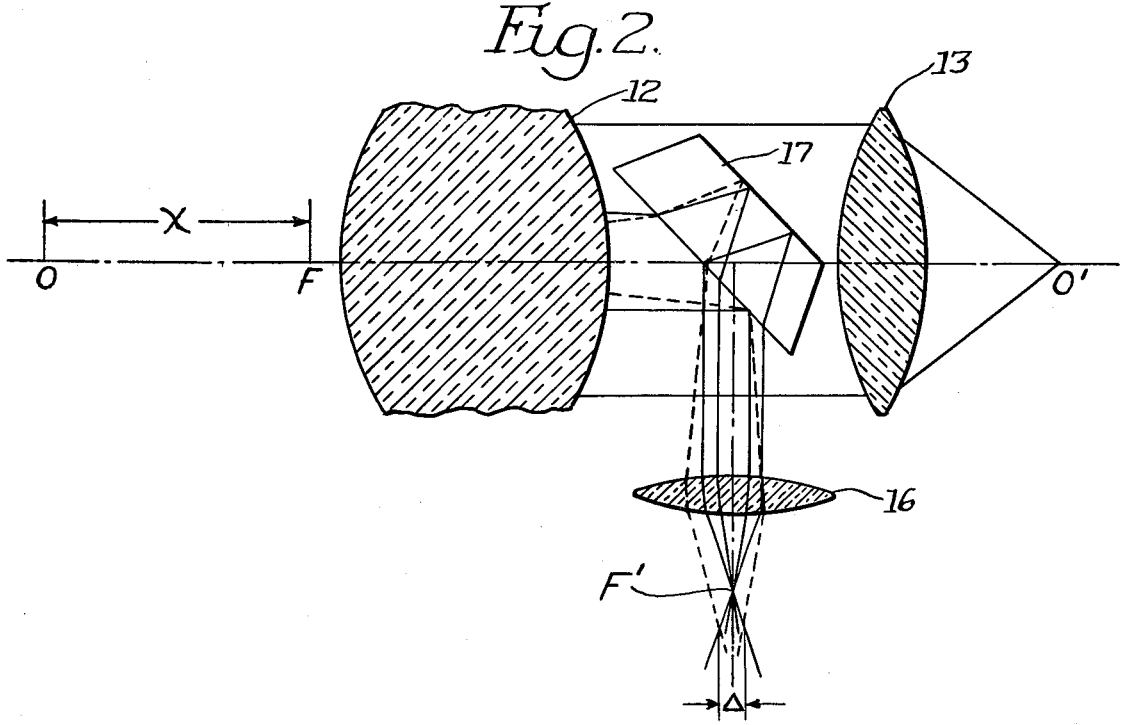
FIG. 2 is a schematic showing of the prior art prism type beamsplitter reflex rangefinder.

FIG. 1 shows the preferred embodiment of the invention and FIG. 2 shows the prior art prism beamsplitter. FIGS. 1 and 2 are similar structures such that their differences are clearly apparent. The reference numbers for similar components in FIGS. 1 and 2 will be identical and the components should be assumed to be the same. FIG. 1 shows the example of the lens system of camera having the dichroic dual beam rangefinder of the invention, wherein the shooting system includes a zoom lens system 12 and a main lens 13 which serve as the objective lens. Object O is focused at a point O' through main lens 13 and zoom lens system 12. The dual beam dichroic rangefinder of FIG. 1 is placed in shooting optical system between the main lens 13 and zoom lens system 12, and it consists of two mirrors 14 and 15 and a viewfinder lens 16. If zoom lens 12 is afocal mirror 14 and mirror 15 can be aligned adjustable relative to the axis OO' at the same angle oc degrees and with a distance between two mirrors of L. The angle oc can be 45 degrees. Mirrors 14 and 15 are small so that very little space is occupied by them when they are placed between said lenses 12 and 13. They do not seriously obstruct incoming light rays when shooting object O. Zoom lens 12 must be afocal if both mirrors 14 and 15 are at the same angle and are spaced a distance L as described. However, if the light from lens 12 is not collimated then the angularity of mirrors 14 and 15 must be adjusted accordingly to form a single image through the viewfinder lens 16.

Figure 4:
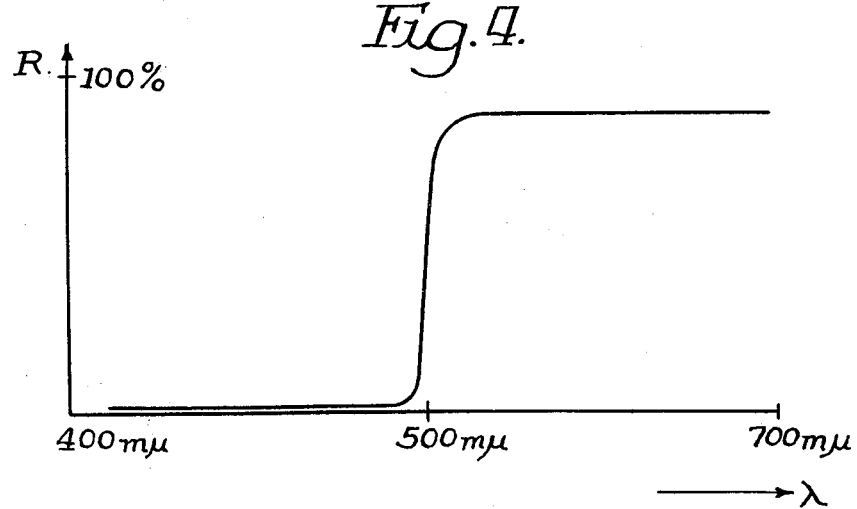
FIGS. 4 and 5 show the reflection factor diagrams of the dichroic mirrors used in this invention.
Figure 5:
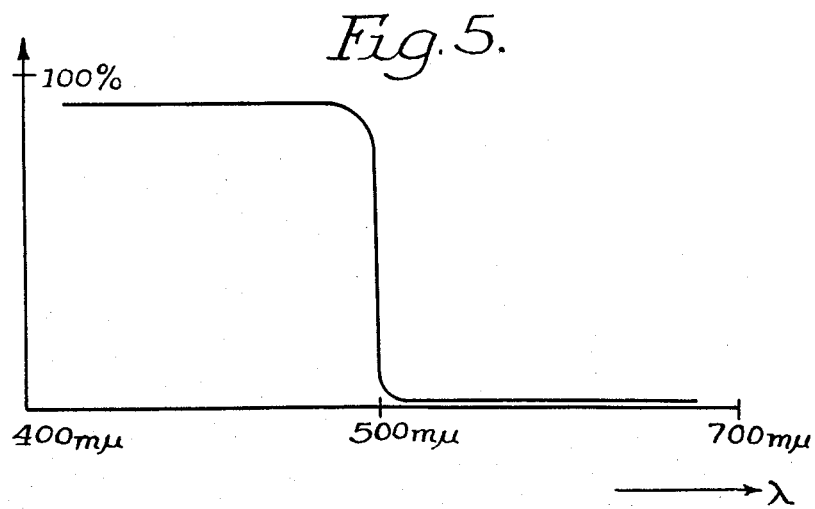

The reflecting surface of said mirror 14 is coated with a material having a reflection characteristic e.g. as shown in FIG. 5 which reflects the blue-green light superiorly. The reflecting surface of mirror 15 is coated with a material which has a reflection characteristic e.g. as shown in FIG. 4 which reflects the red light superiorly. It is desirable that the colors of both light rays reflected by said two mirrors 14 and 15 are complementary to each other whereby the combined light from both neutralizes their colors forming a natural image.

In the rangefinder constructed as explained, the shooting lens is focused on the object when the incoming light bundle (through an afocal zoom lens system) has parallel light rays and the images in viewfinder system formed through mirrors 14 and 15, and their viewer lens 16 coincide at point F'. When the shooting lens is out of focus, the images reflected from mirrors 14 and 15 have a color separation $\Delta$ which can be calculated as follows:

$$\Delta = -(V^2 fl/X) \cdot L$$

In the above formula, V is the afocal magnification of zoom lens 12, fl is the focal length of viewfinder objective lens, X is the distance from the front focal point of the compound optical system of the zoom lens unit and the viewfinder lens to the object O, and L is the distance between mirrors 14 and 15.

The two mirrors 14 and 15 have different color reflecting characteristics but they are related complementary colors. When objective lens is in focus and the light rays reflected by said two mirrors coincide, they form a neutral or natural colored image of the object in the viewfinder; but when the objective lens is out of focus, they form separate colored images in the viewfinder.

Figure 3:
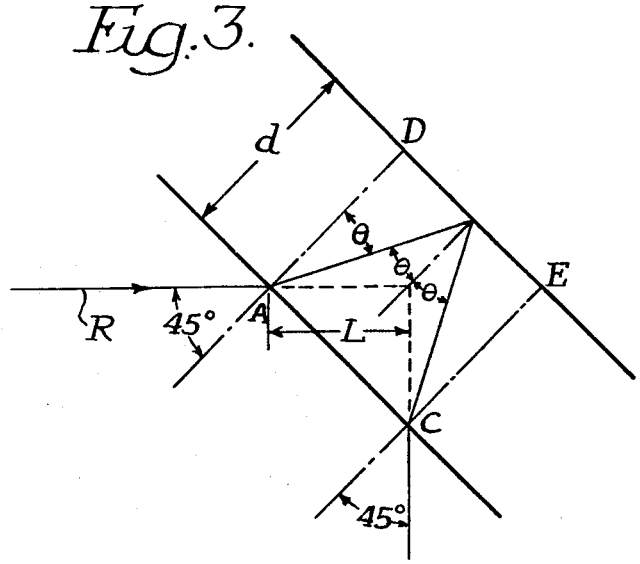
FIG. 3 is an enlarged schematic cross sectional view of the path of light being refracted and reflected by a dichroic beamsplitter.

In FIG. 2, the prior art dichroic beamsplitter prism 17 rangefinder system is shown. The dichroic beamsplitter prism 17 is also shown in FIG. 3 where it is positioned at an angle of 45 degrees to the optical axis OO'. The front surface AC has a dichroic coating and the rear surface DE has a totally reflecting coating. This prior art rangefinder system forms separate colored images in viewfinder when the objective lens is out of focus. The separation $\Delta$ of colored images formed in viewfinder as reflected from surfaces AC and DE is calculated as follows:

$$\Delta = -(V^2 fl/X) \cdot L$$

In the above formula all the terms are as before except the term L which for a beamsplitter prism is as follows:

$$L = d \cdot \sqrt{2}/(2n^2 - 1)$$

In that formula d is the thickness of plano parallel beamsplitter prism and n is the refractive index of prism. In FIG. 3, L corresponds to the distance AF. F is the crosspoint between the light ray R and nodal line from the reflecting point of light ray R on totally reflecting surface DE.

The accuracy of a rangefinder increases as the length of L increases. The length L can be greater with a two-mirror 14 and 15 system than with a beamsplitter prism 17 because in the latter as L is increased the prism 17 becomes physically larger, thus reducing the amount of light able to reach the film. With a dual mirror system as used in the present rangefinder, the basic length can be made longer without interfering with the light quantity available for the film.

In the present dichroic rangefinder, light bundles coming through objective lens form not only duplicate overlapping images but also distinguishable colored images in viewfinder when objective lens is out of focus. Consequently, focusing is easier and the accuracy of the rangefinder is improved. With the dual beam dichroic rangefinder system, it is possible to offer a low cost and compact rangefinder wherein a pair of mirrors can be adjustable for use with non-afocal light rays. While a particular arrangement has been shown and described, the invention is considered to cover any form of dichroic reflecting means which provides separate colored images in the viewfinder when the shooting lens is out of focus. Therefore, the claims which follow are intended to cover all structures giving the foregoing result.

What is claimed is:

1. In a camera having first and second lens elements having a common optical axis defining an optical path therebetween, the first lens element transmitting light rays along the optical path, a rangefinder system to facilitate focusing of said camera on a subject and comprising first dichroic reflecting means mounted in the optical path between the lens elements on one side of the optical axis for intercepting a portion of the light rays and reflecting in a predetermined direction only those light rays with a wave length greater than a predetermined value; second dichroic reflecting means mounted in said optical path between the lens elements on the other side of the optical axis for intercepting another portion of the light rays and reflecting in a predetermined direction only those light rays with a wave length less than about the predetermined value; and an optical system arranged to receive the light rays reflected by said first and second dichroic reflecting means to form a superimposed, naturally colored image in a predetermined plane when the camera is in focus on a subject, and to form separate, differently colored images in said plane when the camera is not focused on the subject.

2. In the camera of claim 1, wherein said predetermined wave length is 500 millimicrons.

* * * * *